United States Patent [19]

Kuan et al.

[11] Patent Number: 5,058,182
[45] Date of Patent: Oct. 15, 1991

[54] METHOD AND APPARATUS FOR HANDWRITTEN CHARACTER RECOGNITION

[75] Inventors: Chih-Chau Kuan, Buffalo; Jonathan J. Hull, Amherst; Sargur N. Srihari, Williamsville, all of N.Y.

[73] Assignee: The Research Foundation of State Univ. of New York, Albany, N.Y.

[21] Appl. No.: 189,365

[22] Filed: May 2, 1988

[51] Int. Cl.[5] .............................................. G06K 9/62
[52] U.S. Cl. ..................................... 382/25; 382/13; 382/18; 382/22; 382/36
[58] Field of Search ...................... 382/20, 22, 24, 28, 382/19, 25, , 51, 13, 36

[56] References Cited

U.S. PATENT DOCUMENTS

| | | | |
|---|---|---|---|
| 3,593,287 | 7/1971 | Kobayashi | 382/24 |
| 3,845,466 | 10/1974 | Hong | 382/18 |
| 4,180,800 | 12/1979 | Isshiki et al. | 382/37 |
| 4,364,023 | 12/1982 | Isshiki et al. | 382/24 |
| 4,628,532 | 12/1986 | Stone et al. | 382/21 |
| 4,783,835 | 11/1988 | Satoh | 382/20 |

Primary Examiner—David K. Moore
Assistant Examiner—Yon Jung
Attorney, Agent, or Firm—Robert P. Simpson; Michael L. Dunn

[57] ABSTRACT

A method and apparatus is provided for written character recognition. The method includes thresholding an input gray level character image to derive its bilevel image, extracting stroke-based features of said bilevel image, classifying the features based upon a set of predetermined rules, determining the identity of the character utilizing the classification, and indicating the identity of the character. A method and apparatus for extracting features of a written character is also provided. This method includes raster scanning the written character to determine stroke-based features, extracting vertical strokes of the character and extracting horizontal strokes of the character.

4 Claims, 5 Drawing Sheets

Microfiche Appendix Included
(1 Microfiche, 46 Pages)

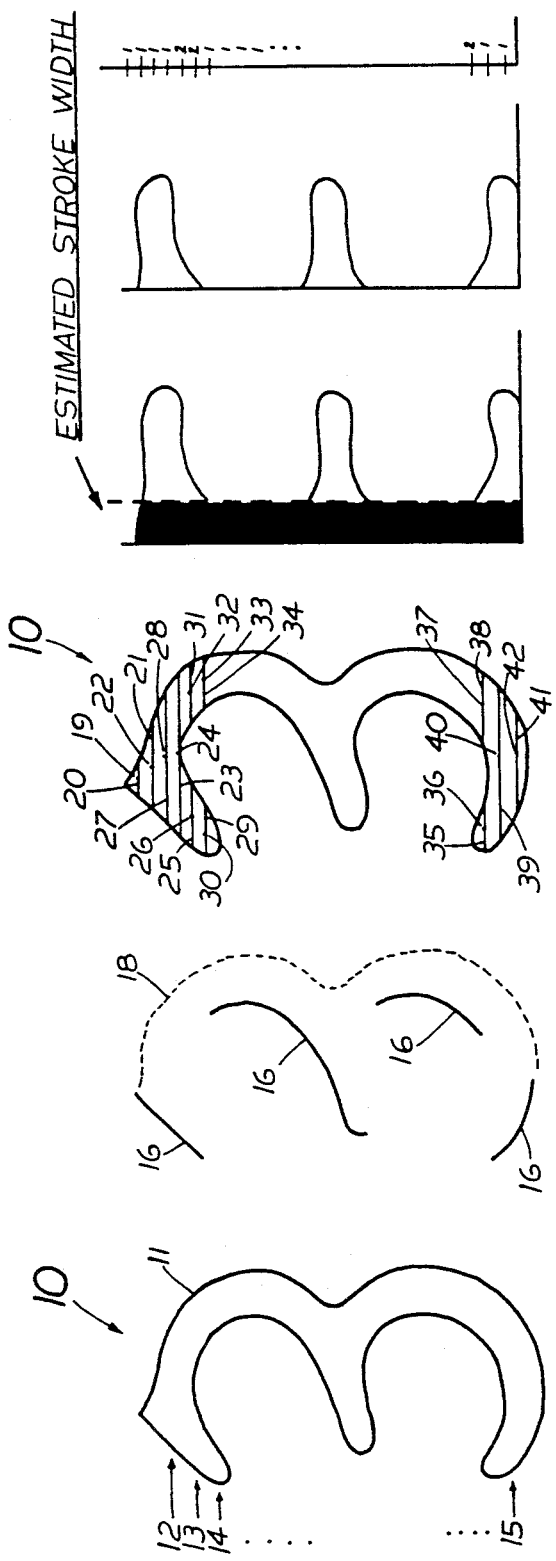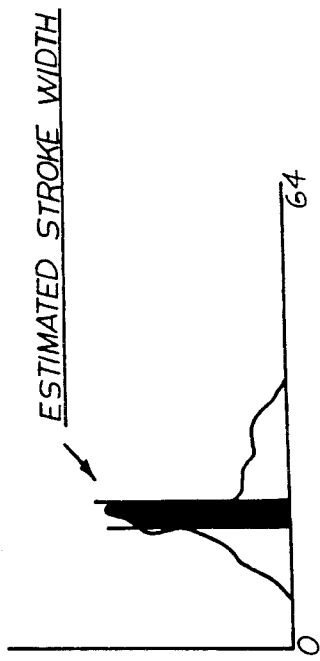

FIG. 3A.　FIG. 3B.　FIG. 3C.　FIG. 3D.　　FIG. 3E.
FIG. 5A.　　FIG. 5B.　FIG. 5C.　FIG. 5D.
FIG. 6A.　　　　　　FIG. 6B.

FIG. 4.

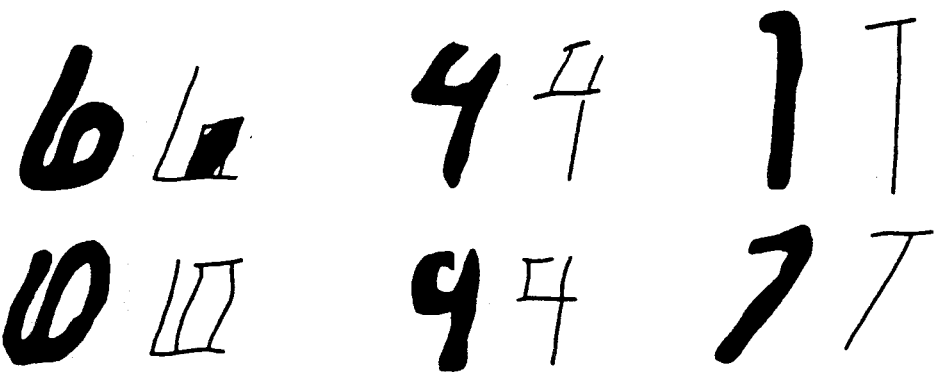
FIG. 7A.   FIG. 7B.   FIG. 7C.
 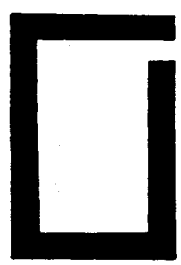  
FIG. 8A.   FIG. 8B.   FIG. 8C.   FIG. 8D.

METHOD AND APPARATUS FOR HANDWRITTEN CHARACTER RECOGNITION

This invention was made with Government support under the Office of Advanced Technology of the United States Postal Service Under Task Order 104230-86-M3990.

In accordance with 37 CFR 1.96, a microfiche appendix is to be considered a portion of the entire "written description" of this invention in conformance with 35 U.S.C 112. The appendix includes one microfiche having 46 frames.

BACKGROUND OF THE INVENTION

The present invention relates to a method and apparatus for recognizing and displaying written characters. More specifically, this invention is directed to a stoke-based method for written character identification, which decomposes a character into strokes, and then uses the strokes as major features for hierarchical classification.

Optical character recognition systems are well known in the prior art. A variety of approaches for solving the particular problem of written character recognition have been proposed and experimented with, see, e.g., Ahmed, P. and Suen, C. Y., "Computer Recognition of Totally Unconstrained Written ZIP Codes", Int. J. Pattern Recognition and Artificial Intelligence 1, 1(1987), 1-15; Ali, F. and Pavlidis, T., "Syntactic Recognition of Handwritten Numerals", IEEE Trans. Syst. Man Cyber. SMC-7 (1977), 537-541; Duerr, B., Haettich, W., Tropf, H. and Winkler, G., "A Combination of Statistical and Syntactical Pattern Recognition Applied to Classification of Unconstrained Handwritten Numerals", Pattern Recognition 12 (1980), 189-199; Huang, J. S. and Chuang, K., "Heuristic Approach to Handwritten Numeral Recognition", Pattern Recognition 19, 1 (1986), 15-19 and Lam, L. and Suen, C. Y., "Structural Classification and Relaxation Matching of Totally Unconstrained Handwritten ZIP Code Numbers", Pattern Recognition 21, 1 (1988), 19-31.

Depending on the algorithms used and the quality of the tested data, diverse recognition rates have been reported. Unfortunately, prior art methods which demonstrate high recognition rates often do so at the computational expense of image processing overhead. Some methods require size normalization processing or time-consuming pixel-based thinning techniques. Other methods utilize relatively low resolution images, thereby necessitating smoothing techniques which require excessive computation time.

It is generally believed in the art that both structural and statistical approaches are necessary for constructing an integrated, reliable system to recognize totally unconstrained characters, see, e.g. Duerr, B. et al. supra. One such method, disclosed in U.S. Pat. No. 4,628,532 issued to Stone, et al., discloses a structural syntactic pattern recognition technique comprising three major steps: 1. Boundary tracing wherein the periphery of a character or image of an object is traced to determine "move" vectors or chain codes which indicate directional changes between points on the periphery; 2. Feature extraction to determine pre-defined geometrical features on the boundary of any part of an image, and 3. Classification. Although the Stone et al. patent claims high operational speed, in fact the processing overhead of the method precludes yet higher speeds while maintaining constant recognition rates. What is needed, then, is a method for written character recognition, utilizing a simple yet efficient feature extraction technique to lower processing overhead.

SUMMARY OF THE INVENTION

A method and apparatus is provided for written character recognition. The method includes thresholding an input gray level character image to derive its bilevel image, extracting stroke-based features of said bilevel image, classifying the features based upon a set of predetermined rules, determining the identity of the character utilizing the classification, and indicating the identity of the character. A method and apparatus for extracting features of a written character is also provided. This method includes raster scanning the written character to determine stroke-based features, extracting vertical strokes of the character and extracting horizontal strokes of the character.

Accordingly, a principal object of the invention is to provide a method and apparatus for character recognition which minimizes image processing overhead.

A more particular object of the invention is to provide a stroke-based feature extraction method and apparatus for use in a character recognition system.

Still a further object of the invention is to provide a method and apparatus for character recognition which recognizes a high number of diverse characters with a high reliability rate.

Yet another object of the invention is to provide a method and apparatus for character recognition which requires no size normalization or pixel-based thinning techniques.

BRIEF DESCRIPTION OF THE DRAWINGS

FIG. 2a shows a bilevel image representation of a written character.

FIG. 2b shows the left and right contour profiles of the bilevel image shown in FIG. 2a.

FIG. 2c shows the run length segments and their associated midpoints.

FIG. 2d shows the projection profile of the bilevel image shown in FIG. 2a.

FIG. 2e shows the hypothesis of the bilevel image shown in FIG. 2a.

FIG. 2f shows the number of run length segments per horizontal scanning line as shown in FIG. 2c.

FIG. 2g shows the run length segment distribution spectrum for the bilevel image shown in FIG. 2a.

FIGS. 3a-3e shows some typical shapes of horizontal projection profiles for various characters.

FIG. 4 shows vector representations of handwritten digits "0" through "9".

FIG. 5a shows an original handwritten representation of a numeral "2".

FIG. 5b shows the extracted vertical strokes (V-strokes) of the character of FIG. 5a.

FIG. 5c shows the extracted horizontal strokes (H-strokes) of the character of FIG. 5a.

FIG. 5d shows the resultant vector representation of the simplified structure of the character of FIG. 5a.

FIG. 6a shows two examples of perceptible holes.

FIG. 6b shows an example of an imperceptible hole.

FIG. 7a-7c shows three pairs of structure-equivalent written digits.

FIG. 8a illustrates operation of a rule for a class 0, type 1 character.

FIG. 8b illustrates operation of a rule for a class 0, type 2 character.

FIG. 8c illustrates operation of a rule for a class 0, type 3 character.

FIG. 8d illustrates operation of a rule for a class 0, type 5 character.

DETAILED DESCRIPTION OF THE INVENTION

Figure 1:
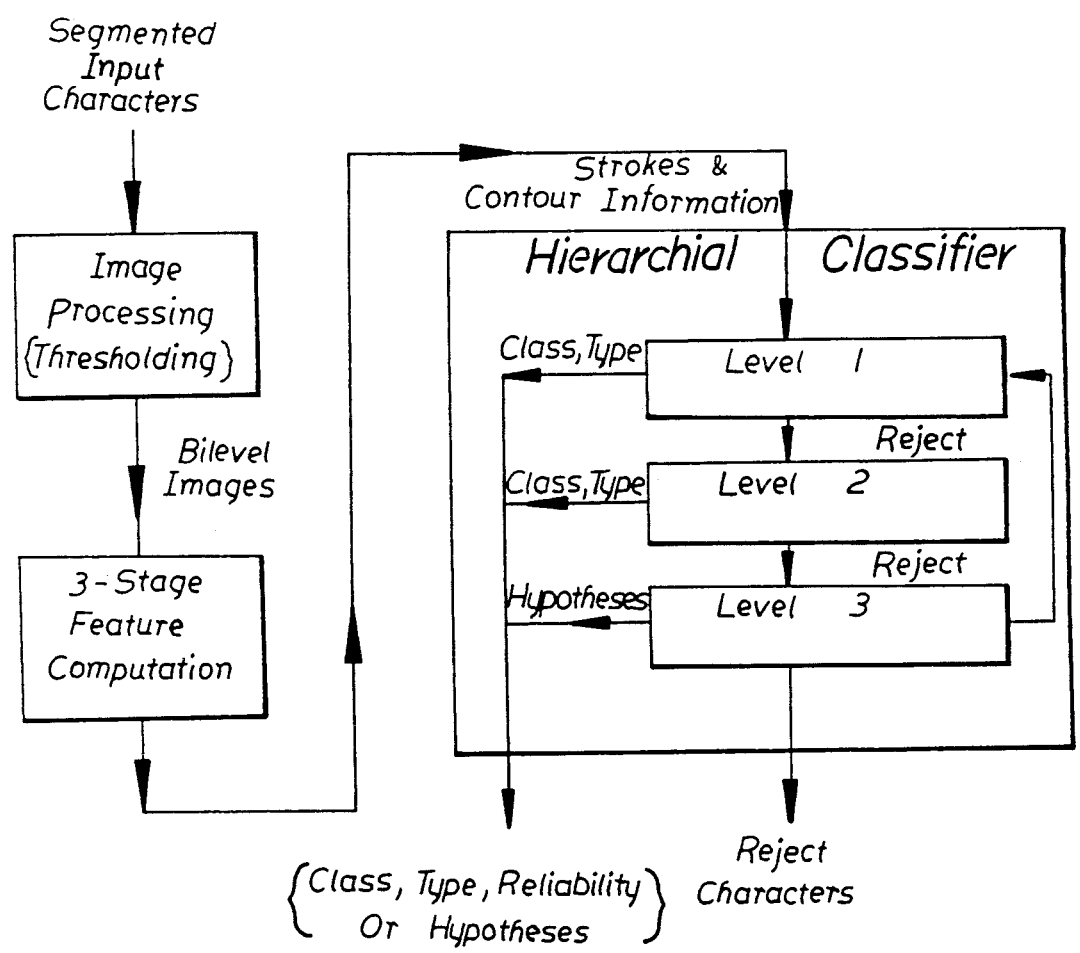
FIG. 1 is a flow diagram of the written character recognition system.

For purposes of the detailed description which follows, the following definitions apply: "Written character" means any character produced by machine, by human hand, or in any other manner. "Gray level image" means an image obtained from optical scanning of a written character. The gray level image is represented by a matrix of discrete pixels, where each pixel represents a level of "grayness". Pixels are assigned values ranging from absolute black to absolute white. The matrix is defined to have horizontal rows and vertical columns of pixels.

"Bilevel image" is an image composed of pixels having values of either absolute black or absolute white.

"Gray level adaptive thresholding" is a technique used to convert a gray level image to a bilevel image.

"Left contour profile" is the set of pixels in each row that define the first transition from white to black as a bilevel image is subjected to raster scanning.

"Right contour profile" is the set of pixels that define the last transition from black to white in each row as a bilevel image is subjected to raster scanning.

"Run length segment distribution spectrum" is a plot of the individual segment lengths (ordinate) versus the number of segments (abscissa) having each given length. Using well-known statistical analysis, this distribution function is analyzed to determine the estimated stroke width, which is the length with the maximum count in the run length segment distribution spectrum.

"Run length segment" is defined as the distance, measured in pixels, of a horizontally adjacent set of black pixels in a bilevel image.

"Horizontal projection profile" is defined to contain a number of accumulators equal to the number of rows in the image. Each accumulator contains a count of the number of black pixels in the corresponding row.

"Hypothesis" is a possible correct identification of a character to be recognized. The hypothesis is generated by a computer program when matching rules are unable to ascertain the identity of the character with high reliability.

"Indicating" the identity of the character means making available a data representation of the identified character for later action by a person or machine.

"Estimated stroke width" is a value corresponding to a calculated interval of the run length distribution spectrum. This interval includes the segment length value having the highest density function (frequency of occurrence) and also includes a variance on either side of this value. The estimated stroke width is an estimate of the width of the stroke produced by the writing instrument.

"Vertical stroke (V-stroke)" is a group of vertically adjacent segments of a bilevel image that have stroke widths approximately equal to the estimated stroke width and have approximately vertical collinear centers.

"Horizontal stroke (H-stroke)" includes the remaining components of the bilevel image (other than vertical strokes). Thus, horizontal strokes include segments which are defined traditionally as "horizontal" and also include segments having angular orientations, i.e., slanted segments.

"Perceptible hole" is defined as an area enclosed by at least one vertical stroke and at least one horizontal stroke that touch end-to-end (as opposed to an "imperceptible hole" which is an area which is enclosed by only one vertical or horizontal stroke).

"Stroke-based features" include left and right contour profiles, run length segments, run length segment distribution spectra, number of run length segments per horizontal scanning row, horizontal projection profiles and perceptible holes, etc. "Class" refers to the identity of a specific character. For example, class 0 corresponds to "0" characters, class 1 corresponds to "1" characters, class A corresponds to "A" characters.

"Type" refers to a given rule within a class. For example, a class 0, type 1 character is a "0" which satisfies rule #1 in class 0, etc.

The method of the invention works briefly as follows. For purposes of this description, "written character" is defined to include both handwritten and machine-generated characters of any shape, type, or size. The method of the invention is theoretically capable of identifying characters of any size. In practice, the lowest size of a character which may be identified is a function of the resolution of the optical scanner used (the higher the resolution, the smaller the size of the character which may be identified), and is not limited by the method itself. In a preferred embodiment described herein, a scanner having a resolution of 300 pixels per inch was used successfully. An input gray level character image is first subjected to gray level adaptive thresholding to derive its bilevel image. Then, by raster scanning, a run length analysis technique is applied to extract stroke-based features. These features are then used to estimate the stroke line width, and the pattern is decomposed into its strokes. Based mainly on the topological structure of the detected strokes, with contour profile information as auxiliary features, the final classification is made by a hierarchical rule matching scheme. A flow diagram of the system architecture is shown in FIG. 1. The method steps are discussed seriatim herebelow:

Gray Level Adaptive Thresholding

The first step in the method is gray level adaptive thresholding. The purpose of gray level thresholding is to separate dark objects from the background and achieve a digital representation of an image which may be efficiently processed to determine its identity.

Scanning of a written character by an optical scanner results in a gray level digital image. This image is composed of a matrix of discrete pixels, where each pixel represents a level of "grayness". Numbers of values for grayness level for pixels may be arbitrarily assigned. Each pixel, in accordance with a preferred embodiment described herein, can have a value ranging from 0 to 255, where a value of 0 indicates absolute black and a value of 255 represents absolute white. Values between 0 and 255 represent various levels of grayness. The 256 levels of grayness merely correspond to the electronic memory architecture of the preferred embodiment. In fact, any arbitrary range of pixel grayness level values can be imagined.

The digital gray level image is then processed by a thresholding technique to determine a bilevel image. A bilevel image is an image represented by pixels having values of either 0 or 255. Thus, a bilevel image is composed of elements (pixels) which are either black or white.

Thresholding methods are well known in the art. One method, disclosed by Otsu in "A Threshold Selection Method From Gray Level Histograms," IEEE Transactions on Systems, Man and Cybernetics,"SMC-9, Jan. 1979, pp. 63-66, computes a threshold as follows:

for each gray level k (typically k are the integers between 0 and 255); for each k compute $\sigma_B^2 = \omega_0 \omega_1 (\upsilon_0 - \upsilon_1)^2$ and set the threshold to the value of k for which $\sigma_B^2$ is maximum where $$\omega_o = \omega(k), \quad \omega_1 = 1 - \omega(k)$$

$$\mu_o = \frac{\mu(k)}{\omega(k)} \quad \mu_1 = \frac{(\mu_T - \mu(k))}{1 - \mu(k)}$$

$$\mu_T = \mu(L)$$

where L is the maximum gray level in the image $$\omega(k) = \sum_{i=1}^{k} P_i \quad \mu(k) = \sum_{i=1}^{k} i \times P_i$$

$$P_i = \frac{n_i}{N} \quad \begin{array}{l} n_i = \text{\# pixels with gray level } i \\ N = \text{\# pixels in the image.} \end{array}$$

Feature Extraction

The next step in the method is to extract the features of the bilevel image in order to determine the identity of the character. The present invention utilizes a stroke-based method of feature extraction. There are three main steps in the feature extraction stage of the method: property computation, stroke extraction, and structure simplification.

Property Computation

In step 1, a first-pass horizontal scan is executed for the purpose of determining various properties of the image. For purposes of illustration, it is assumed that the written characters have already been segmented, i.e., a plurality of characters such as would appear in a typical ZIP Code ® have been separated or segmented by any well known segmenting technique such that an individual character is available for further processing.

Referring now to FIG. 2a, character 10 is a bilevel image obtained by thresholding a gray level image of a written numeral "3". For simplicity, character 10 is represented by boundary 11 which has a thickness of 1 pixel. The area bounded by 11 actually contains black pixels that have been omitted here for illustration purposes. Using the well known technique of raster scanning, the bilevel image of FIG. 2a is scanned horizontally from top to bottom, line by line. Arrows 12, 13, 14 and 15 represent the direction (left to right) and the temporal relation (top to bottom) of scanning. As shown in FIG. 2a, the entire bilevel image is scanned line by line. Each line of scanning is referred to as a horizontal scanning row. The number of rows is variable and depends upon the actual height of the image being scanned. Raster scanning results in extraction of features which are then used to classify the image.

FIG. 2b depicts the left and right contour profiles of the bilevel character image 10 shown in FIG. 2a. Left contour profile 16 is shown as comprising four discontinuous solid segments while right contour profile 18 is shown as comprising a single dotted segment. As the scanning beam of the optical scanner passes from left to right, the left contour profile is shown to comprise the set of pixels that define the first transition from white to black, or from pixels having a value of 255 to pixels having a value of 0. The right contour profile is shown to comprise the set of pixels defining the last transition from black to white, or from pixels having a value of 0 to pixels having a value of 255. Left and right contour profiles are extracted features used to classify and identify the written character. Contour profiles are especially useful when a certain stroke structure is encountered which makes classification based solely on structural features very difficult.

FIG. 2c depicts yet another feature which is extracted to be used in the classification process. FIG. 2c depicts run length segments and shows the midpoint of each segment. A run length segment is the distance, measured in pixels, of a horizontally adjacent set of black pixels in a bilevel image. For example, run length segment 20 having midpoint 19 extends between two pixels which lie on the boundary defining bilevel character image 10. Note that run length segments are also collinear with associated horizontal scanning rows. As shown in FIG. 2c, horizontal scanning row 1 corresponds to run length segment 20 having midpoint 19, row 2 corresponds to segment 21 having midpoint 22, row 3 corresponds to segment 27 having midpoint 28, row 4 corresponds to segment 23 having midpoint 24, row 5 corresponds to segments 25 and 31, having midpoints 26 and 32, respectively, and row 6 corresponds to segments 29 and 34 having midpoints 30 and 33, respectively. Thus, a single scanning row, such as row 5, may have a plurality of associated run length segments. The determination of run length segments continues until the entire image has been scanned. Although intermediate segments and their midpoints are not shown on FIG. 2c, it is to be understood that these segment lengths are determined. As shown in FIG. 2c, bottom segments 35 and 38, having midpoints 36 and 37, respectively; segment 39 having midpoint 40; and segment 41 having midpoint 42, complete the scanning and determination of run length segments for the bilevel image 10.

FIG. 2g represents the run length segment distribution spectrum of the bilevel image shown in FIG. 2a. The abscissa of the graph shown in FIG. 2g represents the length of a segment as measured in pixels, while the ordinate represents the number of segments of the character having a given length. The shaded area represents the estimated stroke width of the character, where stroke width is defined as the width of the stroke created by the writing instrument. The estimated stroke width includes a small variance proportional to the width to allow for variation of the written stroke.

FIG. 2d is a horizontal projection profile of the bilevel image of FIG. 2a. The ordinate of the graph in FIG. 2d corresponds to the horizontal scanning rows while the abscissa is a count of the number of black pixels in each row. The shaded portion of the graph indicates the estimated stroke width as shown in FIG. 2g. The horizontal projection profile is used to generate hypotheses for fast classification. Typical horizontal projection profiles for different groups of numerals are shown in FIG. 3.

FIG. 2e represents an initial hypothesis for classifying the bilevel image. The graphic representation shown in FIG. 2e is formed by removing that aspect of the representation shown in FIG. 2d which corresponds to the estimated stroke width. This hypothesis may then be compared with known horizontal projection profiles for quick classification. For example, the horizontal projection profile hypothesis shown in FIG. 2e corresponds to known horizontal projection profiles for the digits "5" and "3".

FIG. 2f indicates the number of run length segments for the corresponding horizontal scanning rows. For example, in FIG. 2f, the "1" indicates that corresponding rows have only 1 run length segment whereas a "2" indicates that corresponding rows have 2 run length segments. Once again, the number of run length segments per horizontal scanning row is an extracted feature which may be used to quickly classify the character.

FIGS. 3a-3e illustrate typical shapes of horizontal projection profiles for handwritten numerals "3" or "5", "4", "6", "7", and "0" or "8", respectively.

Stroke Extraction

In a second-pass horizontal scan, each group of vertically adjacent segments of the bilevel image that have stroke widths within the estimated stroke width and have approximately vertical collinear centers are extracted as vertical strokes (V-strokes). These V-strokes are then extrapolated or "grown" vertically so as to include the tips of each written stroke. The remaining components of the bilevel image are classified as horizontal strokes (H-strokes). Thus, H-strokes include segments which are defined traditionally as "horizontal" and also include segments having angular orientations, i.e., slanted segments. Information about the length, position, direction, etc., of each stroke is recorded at the time of detection. Noise is also detected and removed in the second-pass scan, on the basis of its consisting of short, small, and isolated groups.

Structure Simplification

Stroke structure can be simplified by removing or merging insignificant or "psychologically imperceptible" strokes without losing the basic structure. This simplification greatly reduces the number of rules required in the classification process. In determining which strokes are removable or mergeable, heuristics were obtained by performing psychological experiments on human recognition of simplified characters. In general, for instance, a V-stroke can only be removed if it is very short compared to the height of the numeral, and satisfies certain other constraints. The merge and/or remove structure simplification technique is applied after the second-pass scan is completed.

Figure 4:
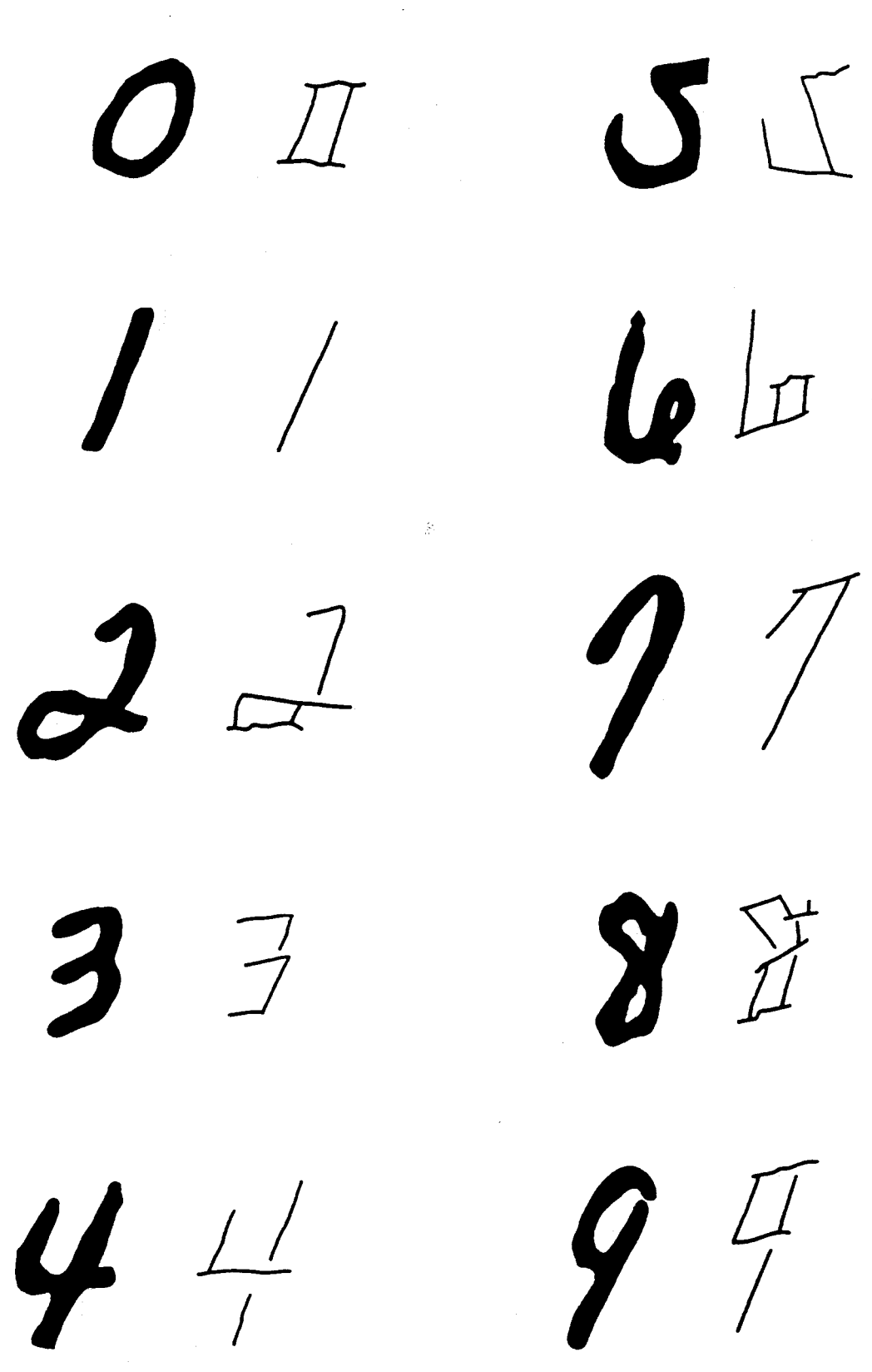

Referring now to FIGS. 5a, 5b, 5c and 5d, an example of stroke detection, simplification, and a vector representation of a handwritten numeral "2" is shown. FIG. 5a shows the original character, FIG. 5b shows the extracted V-strokes, FIG. 5c shows the extracted H-strokes, and FIG. 5d shows the resultant vector representation of the simplified structure. FIG. 4 illustrates resultant vector representations of handwritten numerals, for example, 0 through 9.

Structures known as "holes" are similarly simplified. Holes are classified as either "perceptible" or "imperceptible". Classification of holes is accomplished, not by brute force determination of the size of the encompassed hole, but rather by determining whether a hole is encompassed by detected strokes or not. A perceptible hole is an area enclosed by at least one vertical stroke and at least one horizontal stroke that touch end-to-end (as opposed to an "imperceptible hole" which is an area which is enclosed by only one vertical or horizontal stroke). For purposes of classification, perceptible holes are considered major structural features. FIGS. 6a and 6b are examples of perceptible holes whereas FIG. 6c is an example of an imperceptible hole.

Classification and Identification

The classification and recognition process is done in a hierarchical manner. As shown in FIG. 1, in a preferred embodiment, a three-tier or three-level classifier structure has been implemented successfully. In general, the tiers are arranged such that the strictest rules are found in the first level, relaxed rules are found in the second level, and still more relaxed rules are found in the third level. A strict rule is one having a high reliability rate of successful recognition whereas a relaxed rule has a lower reliability rate. Of course, the claims of the invention are not meant to be limited to a three-level classification structure, as other structures are readily imaginable within the spirit of the invention.

Rules that define the topological structures of different types of characters are defined. An input pattern or character is recognized if its structure features satisfy the specifications of a certain rule. If the rule is satisfied, the character is identified, and may be indicated or displayed. It should be noted that "indication" means making available a data representation of the identified character for later action by a person or machine. For example, the identity of the character could be displayed on a CRT, printed as hard-copy out, fed to a computer, stored in memory, etc. If none of the rules in the first level of the rule base are satisfied, a reject occurs, and the pattern is then tested against rules in the second level. Similarly, if none of the rules in the second level of the rule base are satisfied, a reject again occurs, and the pattern is then tested against the rules in the third level. The rules in the third level are designed to generate a hypothesis if at all possible without final rejection. It is possible within any level that some types of characters share the same type of structure, in which case more than one rule will be satisfied. This ambiguity is resolved by utilizing contour profile information. Contour profile information includes shape discontinuity, concave, convex arcs, etc. This information is obtained quickly and efficiently. Since the global or total structure of ambiguous characters is known, it is necessary to inspect or compare only critical local areas of the contour profiles, thus saving computation time.

Construction of the hierarchical classification rule base is accomplished by examining a large amount of feature extraction data from processing many character samples. These results are summarized and put into different categories. The rule corresponding to each type of pattern is then specified. In the first level of the hierarchical classifier, only those rules specifying very commonly seen character patterns and with very high reliabilities are included. Design of the rules involves a tradeoff between recognition rate and reliability. More generalized rules will enhance the overall recognition rate but sacrifice its reliability since more errors could be introduced. Optimal system design depends upon system performance specifications which consider the average computation time, reject rate and error rate as system cost factors. For the purposes of high reliability, very conservative constraints are imposed for each rule. For example, FIG. 7a shows two structure-equivalent characters. The length ratio of their left two V-strokes indicates the character is a "6" or a "0". Again, by psychological experiments, the proper length ratio is determined, for example, to be 0.9. To ensure high accuracy, threshold values are set to cover ratios from above 1.2 for the character "6" and from below 0.6 for "0", and leave the middle range open. Relaxation of these parameters in succeeding levels of classifiers will cover or overlap in this middle zone and lead to a correct identification or, occasionally, ambiguity will result as discussed above. A similar technique is utilized to discern between the structure equivalent "4" and "9" of FIG. 7b and "1" and "7" of FIG. 7c.

The order in which the rules are matched to the input features is determined by another feature, the horizontal projection profile (HPP). When this HPP has the shape of typical characters representing a group of plausible classes, the rules corresponding to those classes will be tested first. Probabilistically, this ordering scheme expedites the rule matching process, especially when the number of rules in the rule base is large. However, if the HPP does not fall into any of the typical categories, a predetermined matching sequence ordered by the frequency of appearance of each character class is adopted.

After the first level of classification, most of the characters are classified with high reliability. Those rejected cases are then passed to the second level classifier. In the second level, the constraints of each rule are relaxed; also the spatial relationship of the strokes is even allowed to be discontinuous, which means more combinatorial searching is required in the topological structure recognition process. The number of rules in this level is large since many more possible variations of patterns have to be reflected in this level. A substantial number of input patterns are expected to be classified in this level, with relatively lower reliability than that of level one. Once again, the rejected cases from level two are passed to level three.

In the third level classifier, rules are designed to force hypotheses to be generated. Before relaxing the rule constraints further to allow a match to occur, the system will check to see if any simplification in the feature computation process occurred previously. If such simplification did occur, the flow of classification will return to the first level, in an attempt to match the rules again with the most unlikely segments removed or with strokes merged. This process recovers some errors made in the simplification process. The relaxation process can be repeated for several iterations, depending upon the computation time and recognition performance constraints imposed upon the system.

For generating hypotheses, the structural features are again matched to the further relaxed rules of the rule base in level three. In many cases, the results from this classifier level are few candidates for each pattern. These hypotheses are useful for applying contextual knowledge to post-process character recognition results. Still a small number of the input patterns are rejected if no reasonable hypothesis can be generated.

In a preferred embodiment, the method of the invention is implemented by a computer program written in the C programming language. A copy of the source code is found in the microfiche appendix of this patent. Also in a preferred embodiment, classes of characters have been arranged to correspond to specific numeric values. For example, class 0 corresponds to the character "0", class 1 corresponds to the character "1", etc. Also, types of characters correspond to particular rules within a class. For example, a class 0, type 1 character corresponds to a "0" which satisfied rule #1 within class 0. This correspondence represents only a best mode example of the invention. The scope of the claims is not meant to be limited to only numeric characters, but is meant to include all characters, whether they be machine generated or handwritten. For purposes of illustration, representative rules associated with class 0, types 1, 2, 3 and 5 (as shown in FIG. 8) are given below:

Class 0, Type 1

Given there are only two vertical strokes (V-strokes) and two horizontal strokes (H-strokes) detected in an input character image:

If the tops of the V-strokes are connected to one of the H-strokes and the bottoms of the V-strokes are connected to the other H-stroke,

AND the V-stroke on the left is connected to the lower H-stroke on its left end,

AND the V-stroke on the right is connected to the lower H-stroke on its right end,

AND there is a hole in the character,

THEN the character is a "0".

Class 0, Type 2

Given there are only two V-strokes and two H-strokes detected in an input character image:

If the bottoms of the V-strokes are connected to the bottom H-stroke,

AND one of the V-strokes is connected to an end of the top H-stroke,

AND the other V-stroke is not connected to the top H-stroke,

AND there is not a significant peak in the right contour profile,

AND the ratio of the heights of the V-strokes is less than 2.0,

THEN the character is a "0".

Class 0, Type 3

Given there are only two V-strokes and one H-stroke detected in an input character image:

If there is nothing connected to the tops of the V-strokes,

AND the bottom of the left V-stroke is connected to the left end of the H-stroke,

AND the bottom of the right V-stroke is connected to the right end of the H-stroke,

AND there is no significant peak in the right contour profile,

AND the ratio of the heights of the V-strokes is less than 2.5,

THEN the character is a "0".

Class 0, Type 5

Given there are only three V-strokes and two H-strokes detected in the input character image:

If one of the V-strokes is connected to the left ends of the top and bottom H-strokes or the right ends of the top and bottom H-strokes,

AND one of the other V-strokes is connected to the opposite end of the top H-stroke,

AND the bottom of the other V-stroke is connected to the opposite end of the bottom H-stroke,

THEN the character is a "0".

The rules described above are illustrative of approximately 200 rules for character recognition of a preferred embodiment which are described in detail in the computer program included in the microfiche appendix.

Experimental Results

The feature extraction process was tested on a set of 820 digit images, automatically segmented by a segmentation program, from a ZIP Code ® image base. Classifier rules are constructed according to those results. The rules were then applied to the same data set to obtain classification results. Again, according to the firing (matching) frequency and the reliability of each rule, the rules are arranged in different levels of the hierarchial classifier discussed above. In an earlier version of the classifier which included only 109 rules, 89% of the test characters in the data set were correctly classified, with only a 1.2% substitution error. This earlier version included only major rules; no attempt was made to cover the whole data set, that would result in 100% classification. (A more recent version of the classifier, comprising more than 200 rules for numerals only, is included in the computer program of the microfiche appendix).

With this earlier prototype hierarchical classifier, another set of 1,000 digit images are processed and classified. This gives a 88% recognition rate and 2.6% substitution error, very similar to the result of the training data set. Among the three classifiers, level one recognizes 82% of the data with an average of 98.3% reliability. One example of this is: rule for class 0 type 1 is 99.2% correct, with 0.7% probability that the input is the digit 8, and 0.1% that it is digit 2. In order to upgrade the system performance, new rules are added to the classifier, mostly to the second or third level. Also, rules are moved between levels of the classifier.

In another test of this earlier prototype, 8129 characters were tested, and an 86.8% recognition rate was achieved. As shown in the tables below, 8129 digit images were tested. The tables show the classifications according to class and also according to type. Specifically, Table 1 shows the characters classified by digit and separately classified by type. Table 2 shows the firing frequencies of the individual rule types within each class, and Table 3 shows the occurrences of confusion or ambiguity where a character image satisfies more than one rule.

TABLE 1

| digit | classified result as digit (unit: 0.1%) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | C | E | R | F | FC | N |
| 0 | 916 | 4 | 2 | 0 | 0 | 0 | 5 | 1 | 1 | 0 | 916 | 14 | 70 | 1 | 1 | 1381 |
| 1 | 1 | 957 | 1 | 0 | 1 | 0 | 5 | 4 | 0 | 0 | 957 | 11 | 25 | 6 | 6 | 1139 |
| 2 | 2 | 9 | 820 | 5 | 1 | 4 | 1 | 4 | 4 | 0 | 820 | 32 | 137 | 14 | 11 | 813 |
| 3 | 6 | 10 | 12 | 799 | 0 | 10 | 1 | 15 | 6 | 0 | 799 | 66 | 101 | 39 | 34 | 670 |
| 4 | 3 | 7 | 1 | 0 | 852 | 1 | 1 | 0 | 0 | 16 | 852 | 34 | 110 | 7 | 3 | 698 |
| 5 | 20 | 3 | 3 | 2 | 3 | 777 | 8 | 0 | 13 | 14 | 777 | 66 | 146 | 11 | 11 | 636 |
| 6 | 16 | 4 | 3 | 0 | 1 | 4 | 863 | 0 | 3 | 0 | 863 | 37 | 96 | 10 | 4 | 730 |
| 7 | 1 | 4 | 6 | 4 | 4 | 1 | 0 | 890 | 0 | 6 | 890 | 29 | 78 | 4 | 3 | 680 |
| 8 | 28 | 5 | 3 | 0 | 2 | 2 | 3 | 0 | 873 | 13 | 873 | 58 | 66 | 6 | 3 | 639 |
| 9 | 4 | 4 | 1 | 0 | 7 | 3 | 3 | 4 | 1 | 830 | 830 | 27 | 139 | 4 | 4 | 743 |

C: correct rate, E: error rate, R: reject rate, F: confused rate, FC: confused but one is correct
N: number of digits tested.
Total = 8129
Correct         7056    86.8003%
Error            272     3.3460%
Rejected         742     9.1278%
Confused & correct 59    0.7258%

| class | classified result as type (unit: 1%) | | | | | | | | | | | | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 0 | 77 | 4 | 5 | 6 | 1 | 1 | 0 | 1 | 1 | 0 | 0 | 2 | 0 | 0 | 0 | 0 | 0 | 0 | 0 | 0 | 0 | 0 |
| 1 | 100 | 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 64 | 5 | 6 | 2 | 1 | 13 | 2 | 3 | 2 | 0 | 0 | 0 | 0 | 1 | 0 | 1 | 1 | 0 | 0 | 0 | 1 | 0 |
| 3 | 76 | 1 | 9 | 12 | 1 | 3 | 2 | 0 | 0 | 1 | 0 | 0 | 0 | 0 | 0 | 0 | 0 | 0 | 0 | 0 | 0 | 0 |
| 4 | 87 | 2 | 1 | 5 | 3 | 1 | 2 | 0 | 1 | 0 | 0 | 0 | 0 | 0 | 0 | 0 | 0 | 0 | 0 | 0 | 0 | 0 |
| 5 | 41 | 5 | 7 | 15 | 3 | 4 | 5 | 1 | 1 | 1 | 3 | 2 | 8 | 1 | 2 | 0 | 0 | 1 | 0 | 0 | 0 | 0 |
| 6 | 24 | 17 | 42 | 6 | 3 | 1 | 0 | 0 | 0 | 0 | 0 | 0 | 3 | 2 | 1 | 0 | 0 | 0 | 0 | 0 | 0 | 0 |
| 7 | 81 | 16 | 3 | 1 | 0 | 0 | 0 | 0 | 0 | 0 | 0 | 0 | 0 | 0 | 0 | 0 | 0 | 0 | 0 | 0 | 0 | 0 |
| 8 | 34 | 8 | 5 | 15 | 1 | 4 | 1 | 0 | 1 | 6 | 1 | 1 | 1 | 5 | 1 | 0 | 1 | 16 | 0 | 0 | 0 | 0 |
| 9 | 75 | 4 | 13 | 4 | 0 | 2 | 0 | 1 | 0 | 0 | 0 | 0 | 0 | 0 | 0 | 0 | 0 | 0 | 0 | 0 | 0 | 0 |

TABLE 2

Rules fired frequencies & their reliabilities:

| | | | | | | | |
|---|---|---|---|---|---|---|---|
| class 0 type 1: | total: | 977, | correct: | 968 | 0.990788, | error: | 9 | 0.009212 |
| class 0 type 2: | total: | 54, | correct: | 51 | 0.944444, | error: | 3 | 0.055556 |
| class 0 type 3: | total: | 66, | correct: | 61 | 0.924242, | error: | 5 | 0.075758 |
| class 0 type 4: | total: | 92, | correct: | 82 | 0.891304, | error: | 10 | 0.108696 |
| class 0 type 5: | total: | 16, | correct: | 14 | 0.875000, | error: | 2 | 0.125000 |

TABLE 2-continued

Rules fired frequencies & their reliabilities:

| | | | | | | | |
|---|---|---|---|---|---|---|---|
| class 0 type 6: | total: | 19, | correct: | 18 0.947368, | error: | 1 | 0.052632 |
| class 0 type 7: | total: | 7, | correct: | 6 0.857143, | error: | 1 | 0.142857 |
| class 0 type 8: | total: | 12, | correct: | 11 0.916667, | error: | 1 | 0.083333 |
| class 0 type 9: | total: | 28, | correct: | 14 0.500000, | error: | 14 | 0.500000 |
| class 0 type 10: | total: | 3, | correct: | 3 1.000000, | error: | 0 | 0.000000 |
| class 0 type 11: | total: | 5, | correct: | 5 1.000000, | error: | 0 | 0.000000 |
| class 0 type 12: | total: | 25, | correct: | 22 0.880000, | error: | 3 | 0.120000 |
| class 0 type 14: | total: | 7, | correct: | 2 0.285714, | error: | 5 | 0.714286 |
| class 0 type 15: | total: | 6, | correct: | 5 0.833333, | error: | 1 | 0.166667 |
| class 0 type 16: | total: | 11, | correct: | 4 0.363636, | error: | 7 | 0.636364 |
| class 1 type 1: | total: | 1111, | correct: | 1086 0.977498, | error: | 25 | 0.022502 |
| class 1 type 2: | total: | 10, | correct: | 8 0.800000, | error: | 2 | 0.200000 |
| class 1 type 3: | total: | 9, | correct: | 3 0.333333, | error: | 6 | 0.666667 |
| class 1 type 4: | total: | 8, | correct: | 0 0.000000, | error: | 8 | 1.000000 |
| class 2 type 1: | total: | 443, | correct: | 427 0.963883, | error: | 16 | 0.036117 |
| class 2 type 2: | total: | 34, | correct: | 32 0.941176, | error: | 2 | 0.058824 |
| class 2 type 3: | total: | 37, | correct: | 37 1.000000, | error: | 0 | 0.000000 |
| class 2 type 4: | total: | 13, | correct: | 12 0.923077, | error: | 1 | 0.076923 |
| class 2 type 5: | total: | 9, | correct: | 7 0.777778, | error: | 2 | 0.222222 |
| class 2 type 6: | total: | 90, | correct: | 85 0.944444, | error: | 5 | 0.055556 |
| class 2 type 7: | total: | 14, | correct: | 12 0.857143, | error: | 2 | 0.142857 |
| class 2 type 8: | total: | 17, | correct: | 17 1.000000, | error: | 0 | 0.000000 |
| class 2 type 9: | total: | 13, | correct: | 13 1.000000, | error: | 0 | 0.000000 |
| class 2 type 10: | total: | 4, | correct: | 0 0.000000, | error: | 4 | 1.000000 |
| class 2 type 11: | total: | 1, | correct: | 1 1.000000, | error: | 0 | 0.000000 |
| class 2 type 13: | total: | 4, | correct: | 3 0.750000, | error: | 1 | 0.250000 |
| class 2 type 14: | total: | 4, | correct: | 4 1.000000, | error: | 0 | 0.000000 |
| class 2 type 16: | total: | 6, | correct: | 6 1.000000, | error: | 0 | 0.000000 |
| class 2 type 17: | total: | 9, | correct: | 9 1.000000, | error: | 0 | 0.000000 |
| class 2 type 18: | total: | 1, | correct: | 1 1.000000, | error: | 0 | 0.000000 |
| class 2 type 19: | total: | 3, | correct: | 3 1.000000, | error: | 0 | 0.000000 |
| class 2 type 20: | total: | 3, | correct: | 2 0.666667, | error: | 1 | 0.333333 |
| class 2 type 21: | total: | 4, | correct: | 4 1.000000, | error: | 0 | 0.000000 |
| class 2 type 22: | total: | 3, | correct: | 1 0.333333, | error: | 2 | 0.666667 |
| class 3 type 1: | total: | 409, | correct: | 405 0.990220, | error: | 4 | 0.009780 |
| class 3 type 2: | total: | 5, | correct: | 5 1.000000, | error: | 0 | 0.000000 |
| class 3 type 3: | total: | 46, | correct: | 46 1.000000, | error: | 0 | 0.000000 |
| class 3 type 4: | total: | 71, | correct: | 66 0.929577, | error: | 5 | 0.070423 |
| class 3 type 5: | total: | 3, | correct: | 3 1.000000, | error: | 0 | 0.000000 |
| class 3 type 6: | total: | 17, | correct: | 14 0.823529, | error: | 3 | 0.176471 |
| class 3 type 7: | total: | 9, | correct: | 9 1.000000, | error: | 0 | 0.000000 |
| class 3 type 9: | total: | 4, | correct: | 2 0.500000, | error: | 2 | 0.500000 |
| class 3 type 10: | total: | 6, | correct: | 6 1.000000, | error: | 0 | 0.000000 |
| class 3 type 13: | total: | 1, | correct: | 1 1.000000, | error: | 0 | 0.000000 |
| class 3 type 14: | total: | 3, | correct: | 1 0.333333, | error: | 2 | 0.666667 |
| class 4 type 1: | total: | 525, | correct: | 517 0.984762, | error: | 8 | 0.015238 |
| class 4 type 2: | total: | 12, | correct: | 10 0.833333, | error: | 2 | 0.166667 |
| class 4 type 3: | total: | 5, | correct: | 5 1.000000, | error: | 0 | 0.000000 |
| class 4 type 4: | total: | 33, | correct: | 30 0.909091, | error: | 3 | 0.090909 |
| class 4 type 5: | total: | 20, | correct: | 16 0.800000, | error: | 4 | 0.200000 |
| class 4 type 6: | total: | 5, | correct: | 5 1.000000, | error: | 0 | 0.000000 |
| class 4 type 7: | total: | 10, | correct: | 10 1.000000, | error: | 0 | 0.000000 |
| class 4 type 9: | total: | 4, | correct: | 4 1.000000, | error: | 0 | 0.000000 |
| class 5 type 1: | total: | 206, | correct: | 202 0.980583, | error: | 4 | 0.019418 |
| class 5 type 2: | total: | 24, | correct: | 24 1.000000, | error: | 0 | 0.000000 |
| class 5 type 3: | total: | 37, | correct: | 37 1.000000, | error: | 0 | 0.000000 |
| class 5 type 4: | total: | 75, | correct: | 75 1.000000, | error: | 0 | 0.000000 |
| class 5 type 5: | total: | 16, | correct: | 16 1.000000, | error: | 0 | 0.000000 |
| class 5 type 6: | total: | 22, | correct: | 20 0.909091, | error: | 2 | 0.090909 |
| class 5 type 7: | total: | 25, | correct: | 24 0.960000, | error: | 1 | 0.040000 |
| class 5 type 8: | total: | 6, | correct: | 6 1.000000, | error: | 0 | 0.000000 |
| class 5 type 9: | total: | 5, | correct: | 5 1.000000, | error: | 0 | 0.000000 |
| class 5 type 10: | total: | 3, | correct: | 3 1.000000, | error: | 0 | 0.000000 |
| class 5 type 11: | total: | 19, | correct: | 15 0.789474, | error: | 4 | 0.210526 |
| class 5 type 12: | total: | 12, | correct: | 11 0.916667, | error: | 1 | 0.083333 |
| class 5 type 13: | total: | 65, | correct: | 41 0.630769, | error: | 24 | 0.369231 |
| class 5 type 14: | total: | 4, | correct: | 4 1.000000, | error: | 0 | 0.000000 |
| class 5 type 15: | total: | 14, | correct: | 8 0.571429, | error: | 6 | 0.428571 |
| class 5 type 16: | total: | 1, | correct: | 1 1.000000, | error: | 0 | 0.000000 |
| class 5 type 18: | total: | 4, | correct: | 4 1.000000, | error: | 0 | 0.000000 |
| class 5 type 19: | total: | 2, | correct: | 2 1.000000, | error: | 0 | 0.000000 |
| class 5 type 20: | total: | 5, | correct: | 2 0.400000, | error: | 3 | 0.600000 |
| class 5 type 21: | total: | 1, | correct: | 1 1.000000, | error: | 0 | 0.000000 |
| class 6 type 1: | total: | 165, | correct: | 151 0.915152, | error: | 14 | 0.084849 |
| class 6 type 2: | total: | 118, | correct: | 110 0.932203, | error: | 8 | 0.067797 |
| class 6 type 3: | total: | 264, | correct: | 264 1.000000, | error: | 0 | 0.000000 |
| class 6 type 4: | total: | 39, | correct: | 37 0.948718, | error: | 2 | 0.051282 |
| class 6 type 5: | total: | 22, | correct: | 18 0.818182, | error: | 4 | 0.181818 |
| class 6 type 6: | total: | 7, | correct: | 7 1.000000, | error: | 0 | 0.000000 |
| class 6 type 7: | total: | 2, | correct: | 2 1.000000, | error: | 0 | 0.000000 |
| class 6 type 8: | total: | 3, | correct: | 3 1.000000, | error: | 0 | 0.000000 |

TABLE 2-continued

| Rules fired frequencies & their reliabilities: | | | | | | | | |
|---|---|---|---|---|---|---|---|---|
| class 6 type 9: | total: | 4, | correct: | 1 0.250000, | error: | 3 | 0.750000 |
| class 6 type 10: | total: | 3, | correct: | 3 1.000000, | error: | 0 | 0.000000 |
| class 6 type 12: | total: | 2, | correct: | 2 1.000000, | error: | 0 | 0.000000 |
| class 6 type 13: | total: | 20, | correct: | 20 1.000000, | error: | 0 | 0.000000 |
| class 6 type 14: | total: | 11, | correct: | 10 0.909091, | error: | 1 | 0.090909 |
| class 6 type 15: | total: | 6, | correct: | 5 0.833333, | error: | 1 | 0.166667 |
| class 7 type 1: | total: | 504, | correct: | 488 0.968254, | error: | 16 | 0.031746 |
| class 7 type 2: | total: | 97, | correct: | 96 0.989691, | error: | 1 | 0.010309 |
| class 7 type 3: | total: | 25, | correct: | 18 0.720000, | error: | 7 | 0.280000 |
| class 7 type 4: | total: | 5, | correct: | 5 1.000000, | error: | 0 | 0.000000 |
| class 8 type 1: | total: | 191, | correct: | 191 1.000000, | error: | 0 | 0.000000 |
| class 8 type 2: | total: | 44, | correct: | 43 0.977273, | error: | 1 | 0.022727 |
| class 8 type 3: | total: | 31, | correct: | 29 0.935484, | error: | 2 | 0.064516 |
| class 8 type 4: | total: | 85, | correct: | 84 0.988235, | error: | 1 | 0.011765 |
| class 8 type 5: | total: | 3, | correct: | 3 1.000000, | error: | 0 | 0.000000 |
| class 8 type 6: | total: | 21, | correct: | 20 0.952381, | error: | 1 | 0.047619 |
| class 8 type 7: | total: | 10, | correct: | 8 0.800000, | error: | 2 | 0.200000 |
| class 8 type 8: | total: | 1, | correct: | 1 1.000000, | error: | 0 | 0.000000 |
| class 8 type 9: | total: | 3, | correct: | 3 1.000000, | error: | 0 | 0.000000 |
| class 8 type 10: | total: | 31, | correct: | 31 1.000000, | error: | 0 | 0.000000 |
| class 8 type 11: | total: | 9, | correct: | 8 0.888889, | error: | 1 | 0.111111 |
| class 8 type 12: | total: | 6, | correct: | 6 1.000000, | error: | 0 | 0.000000 |
| class 8 type 13: | total: | 5, | correct: | 5 1.000000, | error: | 0 | 0.000000 |
| class 8 type 14: | total: | 29, | correct: | 28 0.965517, | error: | 1 | 0.034483 |
| class 8 type 15: | total: | 6, | correct: | 4 0.666667, | error: | 2 | 0.333333 |
| class 8 type 17: | total: | 7, | correct: | 7 1.000000, | error: | 0 | 0.000000 |
| class 8 type 18: | total: | 100, | correct: | 89 0.890000, | error: | 11 | 0.110000 |
| class 9 type 1: | total: | 478, | correct: | 465 0.972803, | error: | 13 | 0.027197 |
| class 9 type 2: | total: | 31, | correct: | 27 0.870968, | error: | 4 | 0.129032 |
| class 9 type 3: | total: | 87, | correct: | 78 0.896552, | error: | 9 | 0.103448 |
| class 9 type 4: | total: | 23, | correct: | 22 0.956522, | error: | 1 | 0.043478 |
| class 9 type 5: | total: | 6, | correct: | 3 0.500000, | error: | 3 | 0.500000 |
| class 9 type 6: | total: | 19, | correct: | 15 0.789474, | error: | 4 | 0.210526 |
| class 9 type 7: | total: | 3, | correct: | 1 0.333333, | error: | 2 | 0.666667 |
| class 9 type 8: | total: | 9, | correct: | 9 1.000000, | error: | 0 | 0.000000 |

TABLE 3

| Confusions of prototypes: | | | |
|---|---|---|---|
| class 0 type 7 & class 2 type 2: | 1 | class 3 type 4 & class 5 type 13: | 16 |
| class 0 type 9 & class 2 type 22: | 1 | class 3 type 4 & class 7 type 4: | 1 |
| class 1 type 2 & class 6 type 1: | 6 | class 3 type 6 & class 5 type 7: | 2 |
| class 1 type 3 & class 7 type 1: | 3 | class 3 type 6 & class 5 type 11: | 5 |
| class 2 type 1 & class 3 type 4: | 7 | class 4 type 2 & class 9 type 2: | 3 |
| class 2 type 1 & class 5 type 13: | 5 | class 4 type 3 & class 9 type 1: | 1 |
| class 2 type 4 & class 7 type 3: | 1 | class 4 type 4 & class 6 type 7: | 1 |
| class 2 type 5 & class 9 type 7: | 3 | class 6 type 5 & class 8 type 15: | 4 |

Recent efforts on improving the system performance have added more rules to the system rule bases. Testing the new version system on another 7,100 digit images produces a 93.3% recognition rate, 2.5% substitution error, 2.2% having 2 or 3 candidates, and the other 2% rejected. This demonstrates the practicality of the system.

While the method herein described constitutes a preferred embodiment of this invention, it is to be understood that the invention is not limited to this precise method, and that changes may be made therein without departing from the scope of the invention; which is defined in the appended claims. For example, although an embodiment of the invention is described herein which includes rules for characters 0 through 9, the method is equally applicable to other characters, such as alphanumeric characters, simply by expanding the rule data base.

What is claimed is:

1. A method for extracting features of a written character, comprising:
   raster scanning said written character to determine stroke-based features, including contour profiles;
   extracting vertical strokes of said character; and
   extracting horizontal strokes of said character, wherein said stroke-based features include a run length segment distribution spectrum which is used to estimate the character stroke width.

2. A method for extracting features of a written character, comprising:
   raster scanning said written character to determine stroke-based features, including contour profiles;
   extracting vertical strokes of said character; and
   extracting horizontal strokes of said character, wherein said stroke-based features include a run length segment distribution spectrum which is used to estimate the character stroke width and also include a number of run length segments per horizontal scanning row.

3. A method for written character recognition, comprising:
   thresholding an input gray level character to derive its bilevel image;
   making a first-pass raster scan of said bilevel image and extracting stroke-based features of said image including a run length distribution spectrum which is used to estimate a stroke width of said character;

making a second-pass raster scan of said bilevel image and extracting vertical strokes of said image, where vertical strokes are defined as adjacent segments of the bilevel image that have stroke widths within the estimated stroke width and have approximately vertical collinear centers, and classifying any remaining components of the bilevel image as horizontal strokes which are segments which include true horizontal segments as well as segments having angular orientations;

classifying said extracted features and vertical and horizontal strokes based upon a set of predetermined rules;

determining the identity of said character utilizing said classification; and indicating the identity of said character.

4. A method for written character recognition, comprising:

thresholding an input gray level character to derive its bilevel image;

making a first-pass raster scan of said bilevel image and extracting stroke-based features of said image, including separate right and left contour profiles, horizontal projection profile, run length distribution spectrum which is used to estimate a stroke width of said character, and number of run length segments per horizontal scanning row;

making a second-pass raster scan of said bilevel image and extracting vertical strokes of said image, where vertical strokes are defined as adjacent segments of the bilevel image that have stroke widths within the estimated stroke width and have approximately vertical collinear centers, and classifying any remaining components of the bilevel image as horizontal strokes which are segments which include true horizontal segments as well as segments having angular orientations;

classifying said extracted features and vertical and horizontal strokes based upon a set of predetermined rules;

determining the identity of said character utilizing said classification; and indicating the identity of said character.

* * * * *